(12) United States Patent
Ho

(10) Patent No.: US 7,944,819 B2
(45) Date of Patent: May 17, 2011

(54) SYSTEM AND METHOD FOR TRANSMISSION AND ACKNOWLEDGMENT OF BLOCKS OF DATA FRAMES IN DISTRIBUTED WIRELESS NETWORKS

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 726 days.

(21) Appl. No.: 11/262,234

(22) Filed: Oct. 28, 2005

(65) Prior Publication Data
US 2006/0104300 A1 May 18, 2006

Related U.S. Application Data

(60) Provisional application No. 60/623,601, filed on Oct. 29, 2004.

(51) Int. Cl.
*G01R 31/08* (2006.01)
*H04L 12/54* (2006.01)
*G08C 25/02* (2006.01)

(52) U.S. Cl. ......... 370/229; 370/231; 370/428; 714/748
(58) Field of Classification Search .................. 709/229
See application file for complete search history.

(56) References Cited

U.S. PATENT DOCUMENTS

| | | | |
|---|---|---|---|
| 6,038,606 A * | 3/2000 | Brooks et al. | 709/235 |
| 2003/0135640 A1* | 7/2003 | Ho et al. | 709/237 |
| 2003/0172201 A1* | 9/2003 | Hatae et al. | 710/8 |
| 2003/0210710 A1* | 11/2003 | Odman | 370/471 |
| 2004/0008690 A1* | 1/2004 | Kandala | 370/395.21 |
| 2005/0204247 A1* | 9/2005 | Guo et al. | 714/746 |
| 2006/0154603 A1* | 7/2006 | Sachs et al. | 455/39 |
| 2006/0155856 A1* | 7/2006 | Nakashima et al. | 709/227 |

FOREIGN PATENT DOCUMENTS
WO   WO2004/064333   *   7/2004

* cited by examiner

*Primary Examiner* — Daniel J Ryman
*Assistant Examiner* — John Blanton
(74) *Attorney, Agent, or Firm* — Steven A. Shaw; W. James Brady; Frederick J. Telecky, Jr.

(57) ABSTRACT

The present application describes a system and method for transmitting and acknowledging a block of frames in a wireless network. According to an embodiment, a source device sends multiple frames in a block to a recipient device and requests the recipient device to send a single block acknowledgement frame. After receiving multiple frames, the recipient device sends a single block acknowledgement frame to the source device indicating which frames were received and which frames need to be retransmitted, as well as how much payload and how many frames may be transmitted in the next block by the source device.

2 Claims, 2 Drawing Sheets

SYSTEM AND METHOD FOR TRANSMISSION AND ACKNOWLEDGMENT OF BLOCKS OF DATA FRAMES IN DISTRIBUTED WIRELESS NETWORKS

This application is a non-provisional application claiming priority to U.S. Pat. App. Ser. No. 60/623,601, filed on Oct. 29, 2004. The above-referenced application is incorporated herein by reference.

BACKGROUND

1. Field of the Invention

The invention relates to data communications and networking, and in particular, system and method of transmitting multiple data frames and receiving a single acknowledgement frame from the recipient of data frames in a distributed wireless network.

2. Description of the Related Art

Generally, IEEE 802.11 based wireless networks require access points to coordinate and control medium access of devices in the network. Recently, a new generation of distributed wireless networks using high-speed, short-range ultrawideband technology has been proposed by Multiband OFDM Alliance (MBOA) or WiMedia Alliance that does not require any existing infrastructure (such as access points) for communication. These networks can provide data throughput of up to about 500 Mbps. Protocols are defined for devices in a distributed wireless network to detect other devices within their neighborhood and establish communication with them without having to go through access points. The basic architecture of the wireless network is defined by various specifications issued by WiMedia, such as "Distributed Medium Access Control (MAC) for Wireless Networks", Draft 0.99, Oct. 14, 2005, which is incorporated herein by references in its entirety for all purposes.

Each device in a distributed wireless network operates in a dynamic environment and communicates with other devices in its neighborhood directly. In a typical wireless network, a transmitting device sends a protocol data unit (PDU), such as a packet, frame, or the like, to a recipient device, and the recipient device acknowledges each PDU. These acknowledgements confirm the receipt of the transmitted PDU. If the transmitting device does not receive an acknowledgement for the transmitted PDU, then the transmitting device retransmits the PDU according to the applicable medium access rules. The transmission of acknowledgement for each PDU, plus the associated interframe frame space (IFS), consumes a considerable amount of bandwidth and degrades the data throughput. Therefore, there is a need for a system and method for an efficient mechanism for transmitting and acknowledging a block of PDUs in a wireless network.

SUMMARY

The present application describes a system and method for transmitting and acknowledging a block of PDUs, or frames, in a wireless network. According to an embodiment, a source device sends multiple frames to a recipient device and requests the recipient device to send a single block acknowledgement (B-ACK) frame. After receiving multiple frames, the recipient device sends a single B-ACK frame to the source device indicating which frames were received and which frames need to be retransmitted, as well as how much payload and how many frames may be transmitted in the next block by the source device.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

DESCRIPTION OF THE PREFERRED EMBODIMENT(S)

The description that follows presents a series of systems, apparatus, methods, and techniques that facilitate additional local register storage through the use of a virtual register set in a processor. While much of the description herein assumes a single processor, process, or thread context, some realizations in accordance with the present invention provide expanded internal register capability customizable for each processor of a multiprocessor, each process and/or each thread of execution. Accordingly, in view of the above, and without limitation, certain exemplary exploitations are now described.

Figure 1:
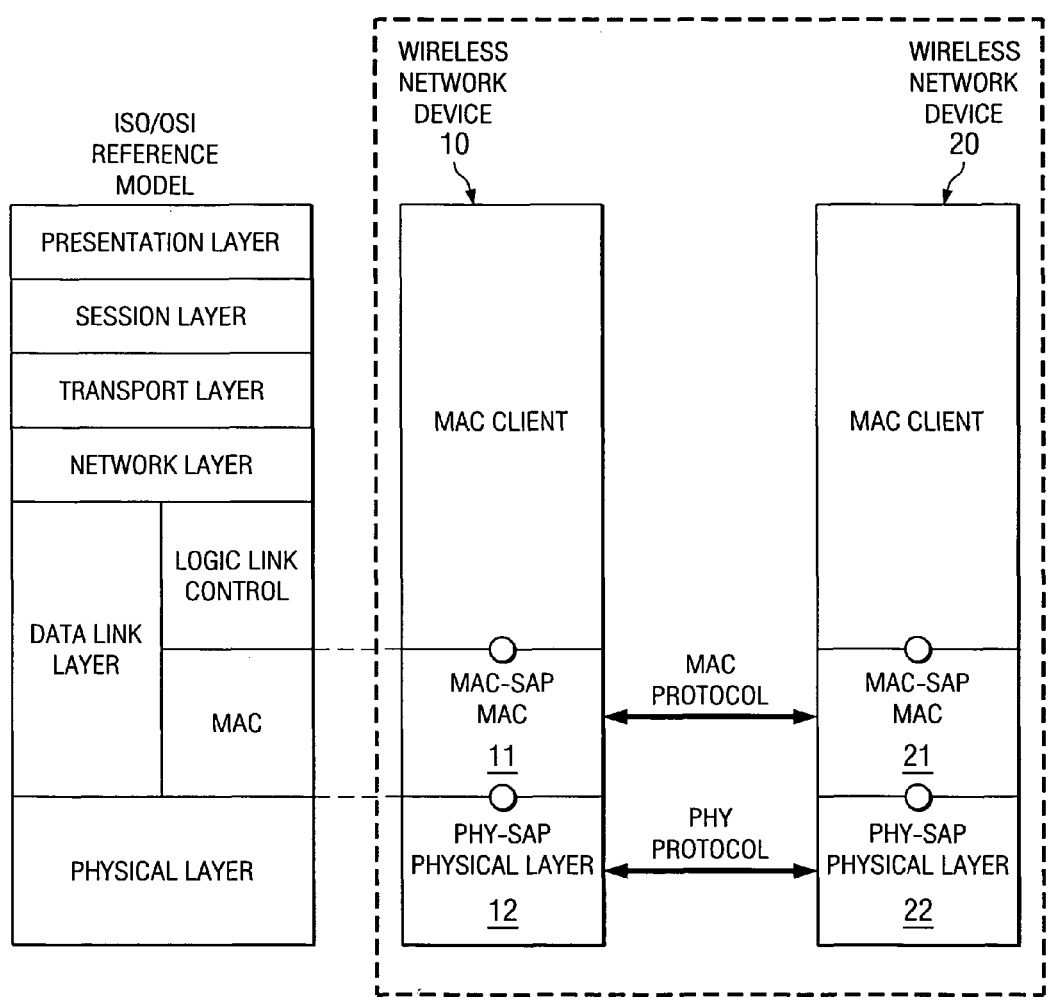
FIG. 1 illustrates the architecture of a wireless network according to an embodiment with reference to standard OSI reference model.

FIG. 1 illustrates the architecture of a distributed wireless network 100 with reference to standard OSI reference model according to an embodiment. The wireless network includes two devices 10 and 20. Devices 10 and 20 can be any device (e.g., laptop computer, video camera, TV, personal digital assistant, mobile phone, and the like) capable of communicating with other devices. Device 10 includes a medium access control (MAC) sublayer 11 and a physical layer (PHY) 12. The MAC sublayer 11 corresponds to the MAC function of the data link layer in the ISO model, while the PHY layer 12 corresponds to the PHY function of the ISO model. Likewise, device 20 includes a MAC sublayer 21 and a PHY layer 22 with a similar correspondence to the ISO model.

The MAC sublayer provides service to the sublayer itself, or the MAC client at higher levels of protocol via the MAC service access point (MAC-SAP), and the PHY layer in turn provides service to the MAC sublayer via the PHY-SAP. The communication between MAC sublayers or entities of various devices is done using MAC frames. MAC frames are defined as a sequence of fields in a specific order. MAC frames are delivered to PHY layer for transmission over a physical channel. According to an embodiment, a MAC frame consists of a fixed-length MAC header and an optional variable-length MAC frame body. The PHY layer adds PHY related parameters to the MAC frame (e.g., a preamble, a PHY header, and the like) to the MAC frame before transmission to facilitate the reception of the frame by the recipient PHY. The MAC and PHY headers are followed by a header check sequence (HCS) inserted in a PHY layer convergence procedure (PLCP) header, while the MAC frame body includes a frame payload and a frame check sequence (FCS). An HCS or FCS is in general a parity check sequence or cyclic redundant check (CRC) for error checking purposes.

The MAC and PHY functions can be implemented in software, hardware, or a combination therefof. For example, a device may include a customized integrated circuit configured for providing PHY interface and MAC functionality along with a processor configured to implement higher-level protocol layers for user interface and establish various sessions according to specific protocol implementation. Similarly, these functions can be integrated into one integrated circuit or provided via an external device configured to communicate with these devices. The MAC and PHY functionalities along with higher-level protocol implementation can be configured in devices such as computers, TV, video camera, personal digital assistant, mobile phone, entertainment systems (DVD players, stereos, etc.) and the like that are desired to be part of the distributed network for communication with each other without an access point.

Figure 2:
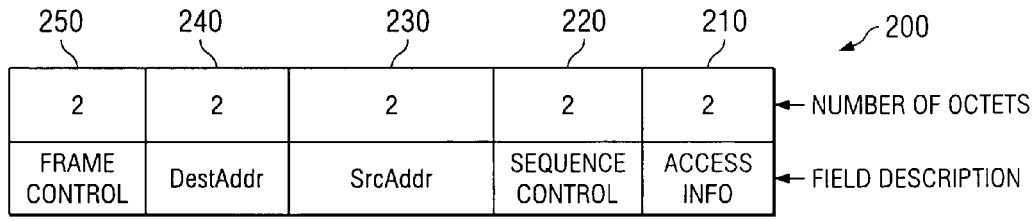
FIG. 2 illustrates an exemplary format of a MAC header according to an embodiment.

FIG. 2 illustrates an exemplary format of a MAC header 200 according to an embodiment. The MAC header includes fields, Access Information 210, Sequence Control 220, SrcAddr 230, DestAddr 240, and Frame Control 250, each field being two octets long. In the present example, the MAC header 200 is ten octets long; however, the size of the MAC header 200 can be adjusted according to the network and protocol requirements. The Access Information field 210 provides information regarding medium access such as the duration for which a medium is expected to be busy after the end of the PLCP header of the current frame over the wireless medium; information regarding whether more data is to be expected by a recipient after the receipt of the current frame; and the access method used (e.g., distributed reservation protocol, prioritized contention access, and the like). The Sequence Control field 220 identifies the sequence order of MAC service data units (MSDUs), or MAC command data units, and their fragments. The SrcAddr field 230 includes the device address of the transmitting source device, and the DestAddr field 240 includes the device address of the intended recipient (destination) of the current frame. The DestAddr field 240 can identify a single recipient device for a unicast frame, a group of recipient devices for a multicast frame, or all recipient devices in the network for a broadcast frame. The Frame Control field 250 includes various parameters for providing control information for the frame as described below.

Figure 3:
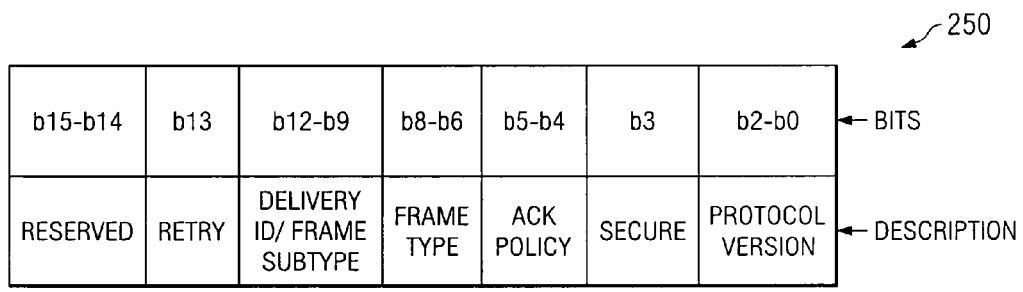
FIG. 3 illustrates an exemplary format of a Frame Control filed of the MAC header according to an embodiment.

FIG. 3 illustrates an exemplary format of the Frame Control filed 250 according to an embodiment. The Frame Control field 250 is two octets (16 bits) long. Bits b0-b2 identify the version of a MAC protocol employed for the data communication. Bit b3 identifies whether the current frame is secured, i.e., if the current frame is protected by security means such as encryption and authentication. Bits b5-b4 indicate the type of acknowledgement requested by the transmitting device. This field is explained in more details in the following sections. Bits b8-b6 define the type of the current frame. Table 1 illustrates some of the values of this field.

TABLE 1

Frame Type field encoding.

| Value | Description |
|---|---|
| 0 | Beacon frame |
| 1 | Control frame |

TABLE 1-continued

Frame Type field encoding.

| Value | Description |
|---|---|
| 2 | Command frame |
| 3 | Data frame |
| 4 | Aggregated data frame |
| 5-7 | Reserved |

Bits b12-9 are used as a Delivery ID field for data frames and aggregated data frames, or as a Frame Subtype field for control and command frames, and reserved for all other types of frames. Bit b13 indicates whether the current frame is a retransmission of an earlier frame in any data or command frame, and is considered as reserved for all other types of frames. Bits b15-b14 are reserved for all frame types.

The ACK Policy field (bits b5-b4) indicates the type of acknowledgement requested by the source device. Table 2 illustrates possible values for this field.

TABLE 2

ACK Policy field encoding.

| Value | ACK Policy Type | Description |
|---|---|---|
| 0 | No-ACK | The recipient device does not need to acknowledge the current frame, and the source device considers the transmission as success regardless of the result. |
| 1 | Imm-ACK | The recipient device returns an Imm-ACK after correctly receiving the current frame. |
| 2 | B-ACK | The recipient device keeps track of frames that indicate this policy until it receives a request to respond with block acknowledgement, and the recipient device responds with a B-ACK frame. |
| 3 | B-ACK Request | The recipient device responds with a B-ACK frame when this policy is set. |

A source device can request the recipient device to keep track of a block of frames the source device transmits by setting the ACK Policy field of those frames to B-ACK, and then request the recipient to send back a B-ACK frame acknowledginh the block of frames by setting the ACK Policy field to B-ACK Request. According to an embodiment, to set the ACK Policy field to B-ACK, the source device sets bits b5-b4 of the Frame Control field to a value of 2; to set the ACK Policy field to B-ACK Request, the source device sets bits b5-b4 of the Frame Control field to a value of 3. Upon receiving a frame with B-ACK Request set, the recipient device sends a single B-ACK frame indicating that since the receipt of the first frame in the previous block of frames with ACK Policy set to B-ACK, which frames were received correctly and which frames need retransmission. More on the B-ACK frame is described below.

Figure 4:
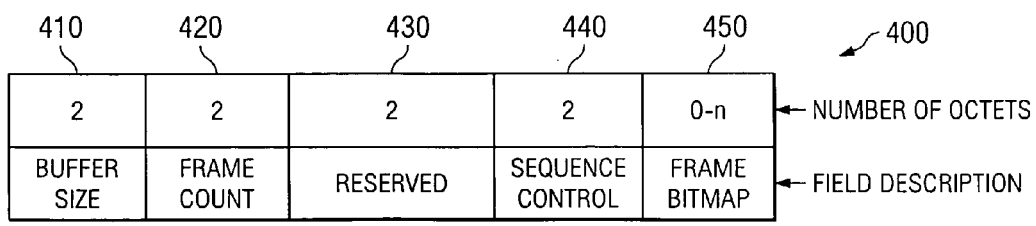
FIG. 4 illustrates an exemplary format of a B-ACK frame payload according to an embodiment.

FIG. 4 illustrates an exemplary format of a B-ACK frame payload 400 according to an embodiment. The Buffer Size field 410 specifies the available buffer space for the next block in units of octets, which is the maximum number of octets in the sum of the frame payloads of all frames in the next B-ACK block. The value of the Buffer Size field 410 field varies in tandem with that of the Frame Count field 420. The Frame Count field 420 specifies the maximum number of frames in the next block without regard to frame size. When the recipient device is not holding any received frames from being released to the MAC client, the Buffer Size field 410 is set to the capacity of the buffer, in units of octets, allocated for receiving a block of frames with the last one containing a B-ACK request. When the block recipient device is holding some received frames and waiting for some missed frames, the value of the Buffer Size 410 is reduced by the aggregate size of the frame payloads in those received frames still held in the buffer.

The Sequence Control field 440 specifies a MAC service data unit (MSDU) number in bits b13-b3 and a fragment number in bits b2-b0. Bits b15-b14 of this field are reserved. An MSDU is a unit of information that is delivered as a unit between MAC-SAPs of networked devices. The Sequence Control field 440 specifies the MSDU number and fragment number of the first frame expected of the next block by the recipient device. All frames older than the frame identified in this field have been either correctly received or no longer sought by the recipient device. The identified frame is the oldest or earliest frame for which the recipient device is still waiting, possibly holding some later frames that have been received correctly from being released to the MAC client; however, this frame may have been discarded by the source device and the next block received may be different from the block expected by the recipient device. The recipient device can find out the difference based on the contents of the last B-ACK frame payload it sent and the frames of the next block it receives.

If the Sequence Control field 440 references a frame that elicited the last B-ACK response, then it is interpreted as indicating the next closest frame in sequence that has not been received correctly. This interpretation is needed for the source and recipient devices to have the same understanding of the sliding block window as further defined below. The Frame Bitmap field 450 varies in length and specifies the reception status of the previous block as expected by the block recipient device. If no frame retransmissions are needed by the block recipient, the Frame Bitmap field 450 is not present. Otherwise, the least-significant octet of this field corresponds to the MSDU indicated by the Sequence Control field 440. Each successive octet, when present, corresponds to each successive MSDU in consecutive order.

The most-significant octet of the Frame Bitmap field 450 corresponds to the MSDU with the highest MSDU number (in modulo 2048 sense) that has been partially or fully received with a valid FCS, or to an MSDU with a lower MSDU number. In the latter case, it is implied that none of the MSDUs following the one corresponding to the most-significant octet has been correctly received, with the exception of the frame requesting the last B-ACK response.

The frame requesting the last B-ACK response is considered to have been received correctly by way of receipt of the B-ACK response. There could be frames not received correctly between the second-to-last frame received correctly and the last frame received correctly. These frames are not explicitly represented in the Frame Bitmap, nor is the last received frame. Each bit in a given octet designates a fragment of the corresponding MSDU. Specifically, bit 0 corresponds to fragment number 0, bit 1 corresponds to fragment number 1, and the like. A non-fragmented MSDU is considered fragment number 0 of that MSDU. If a fragment of an MSDU was received correctly, the corresponding bit is set to 1; otherwise, the bit is set to 0. The bits corresponding to fragments that did not exist are set to 0 as well.

The B-ACK frame provides provisions for the transmission of the next block of frames and acknowledges receipt of the previous block of frames. All the fields in a B-ACK frame pertain to the transmission of a block of data or aggregated frames associated with the same stream or user priority from the same source device. According to an embodiment, a B-ACK frame is sent in response to a frame with the ACK Policy field set to B-ACK Request which was received without any HCS and FCS errors. According to another embodiment, a B-ACK frame is sent in response to a frame with the ACK Policy field set to B-ACK Request which was received with a correct HCS value but not necessarily a correct FCS value.

According to an embodiment, a B-ACK mechanism allows a source device to transmit a block of frames in succession to a recipient device and to receive a single block acknowledgement frame from the recipient indicating which frames were received and which need to be retransmitted in the previous block of frames. A block consists of zero or more frames with ACK Policy set to B-ACK, and a final frame with ACK Policy set to B-ACK Request. All the frames in a block are associated with the same stream or user priority and destined to the same recipient. A source device maintains a dedicated MSDU number counter to apply the B-ACK mechanism to a stream with a recipient device. A source device may also employ the B-ACK mechanism for traffic sharing the same user priority and destined to the same recipient device by maintaining a dedicated MSDU number counter for such traffic.

A source device may have multiple instances of the B-CK mechanism with the same recipient device, each for one stream or for the traffic belonging to the same user priority. While a source device has one or more instances of the B-ACK mechanism with a recipient device, it may also have instances of the B-ACK mechanism with other recipient devices. An instance of a B-ACK mechanism consists of an initialization procedure, an operation procedure, and a termination procedure, all of which are described below according to an embodiment. A source device initiates an instance of the B-ACK mechanism with a recipient device for frames that are either from the same stream or having the same user priority.

According to an embodiment, to initiate a new instance of the B-ACK mechanism, the source device transmits a single data or aggregated frame with B-ACK Request set. Upon receiving this frame with valid HCS and FCS values, the recipient device returns a B-ACK frame one short interframe space (SIFS) time later, setting the Buffer Size to the size of the receive buffer allocated to hold received frames in units of octets, and setting the Frame Count to the number of frames that can be received and held in the receive buffer before being released to the MAC client. The SIFS time is determined by the applicable protocol. The receive buffer refers to the buffer space available for storing the frames with the SrcAddr and stream index or user priority to which this block ACK is applied. The Sequence Number and Fragment Number fields in the B-ACK frame body corresponds to the numbers of the first data or aggregated data frame in the next block expected by the recipient device. The Frame Bitmap field is not present in the first B-ACK frame.

If the recipient device cannot accept the request for starting a new instance of B-ACK mechanism, it responds with a B-ACK frame with no frame payload. When the source device receives a B-ACK frame with no frame payload, it transmits the next frame with B-ACK Request set to continue the initiation of the B-ACK mechanism. When the source device receives a B-ACK frame containing Buffer Size and Frame Count fields both of non-zero values, it proceeds to normal operation as described below.

The source device transmits a block of data or aggregated data frames based on the values of these fields, employing the last frame of the block to request another B-ACK frame. The first frame in the block may be indicated in the Sequence Control field of the received B-ACK frame body. Frames older than that indicated frame are transmitted or retransmitted. Any frame of the block may contain a final or non-final fragment of an MSDU, a complete MSDU, or an aggregate of MSDUs. The number of the frames in the block will not exceed the value of the Frame Count field and the total size of the frame payloads of those frames must remain within the Buffer Size announced by the recipient device in the last B-ACK frame. A block may include retry and new frames, all of which follow one after another in ascending order of the values of the MSDU number-fragment number field. The frames are not necessarily consecutive when a block includes retry frames. A block may be interleaved by other frames that are not part of the block when the source device is sending frames belonging to different streams or having different user priority values, or sending frames to different devices, or sending frames of other types. A block may be interleaved by other blocks.

Upon receipt of a data or aggregated data frame indicating a B-ACK request (and hence end of a block) and containing correct HCS and FCS fields, the recipient device returns a B-ACK frame within a SIFS period. In the B-ACK frame, the recipient device updates the Buffer Size and Frame Count fields to reflect the overall size and number of frames of the next block that the receive buffer can hold, taking into account the received frames currently held in the receive buffer waiting for missing frames with earlier MSDU Number-Fragment Number values. Each of these held received frames reduces the values of Buffet Size and Frame Count fields. The recipient device also sets the Sequence Control field to correspond with the first frame expected of the next block. The recipient device may set this field to indicate the last frame of the last block, when the field actually points to the next frame that follows. This Sequence Control does not necessarily reference the first or sole fragment of an MSDU, but identifies the frame which has the smallest MSDU Number-Fragment Number value (in modulo) yet not correctly received but still expected by the recipient. Due to this missing data frame, the recipient device holds some newer frames correctly received from being released to the MAC client. If the recipient device has given up waiting for missing frames or has received all previous frames, then this frame is the next frame expected after the last received frame of the same stream index or user priority.

The Sequence Control field in the B-ACK frame body (but not in the MAC header) defines the start boundary of a sliding block window, while the Buffer Size and Frame Count together define the window size. If the Sequence Control field contains the Sequence Number and Fragment Number of the last frame in the last block, the block window starts with the frame after that last frame. The frames covered by the block window are not necessarily of consecutive values of MSDU Number and Fragment Number when some or all of them are retries as requested in the Frame Bitmap of the last B-ACK frame.

In the B-ACK frame, the recipient device includes a Frame Bitmap field unless it does not need any retransmissions of transmitted frames. Each octet in this field denotes an MSDU, and each bit in a given octet represents a fragment of the corresponding MSDU. The bitmap starts with the least-significant octet matched to the MSDU referenced in the Sequence Control field preceding this bitmap, and ends with the most-significant octet linked to the MSDU partially or fully contained in the frame requesting this B-ACK, or to an earlier MSDU with a lower MSDU number to indicate all subsequent MSDUs except the frame with the B-ACK request have not been received. The recipient device sets those bits corresponding to correctly received fragments except the last received fragment which indicated a B-ACK request to one, and set the other bits to zero.

The recipient device releases the received MSDUs in ascending order of MSDU numbers to the MAC client. The recipient device does not hold any correctly received MSDUs at the MAC sublayer for longer than their applicable lifetimes, as determined by the local MAC entity according to implementation dependent timeouts, higher layer defined timestamps, etc. When determining that a missing frame has been discarded by the sending device, based on the sliding block window defined by the various fields in the last B-ACK frame body, the recipient device does not wait for that frame but instead releases the frames that have been held due to that missing frame. The recipient device discards any frames received after frames with higher MSDU numbers have been received and passed up to the MAC client. The recipient device may respond to a B-ACK request with a B-ACK frame containing a zero value for the Buffer Size and/or Frame Count when its buffer is fully occupied by the frames received but not yet released to the MAC client.

After sending a block ending with a frame requesting a B-ACK, the source device waits for a B-ACK response. If the source device receives a B-ACK frame containing a zero Buffer Size or/and Frame Count, it retransmits the last frame with B-ACK Request set. If the source device receives a B-ACK frame with nonzero values for both the Buffer Size and Frame Count fields, it transmits the next block of frames based on the information provided in that B-ACK frame. The source device considers the last frame to have been received without HCS and FCS errors upon receipt of the B-ACK frame. The source device also assumes that all frames, except the last frame, sent after the frame designated by the most-significant bit that was set to one in the returned bitmap were not received by the addressed recipient device. If the source device does not receive any response, then it retries the last frame, still with B-ACK Request set, until it receives a B-ACK response or the retry has exceeded an implementation dependent limit or time. In the latter case, the source device may proceed to transmit the next frame with B-ACK Request set, which constitutes the next block.

A Sequence Control field in the B-ACK frame payload specifying the last received frame with B-ACK Request set is interpreted as referencing a subsequent, closest frame yet to be received. With this understanding, the recipient device may update the Sequence Control field in the frame payload of next B-ACK frame such that the field points to the next expected frame after a frame subject to this B-ACK is received, but need not update this field after the frame with B-ACK Request set is received. Without the need for setting the bits in the Frame Bitmap field that correspond to the last received frame and the immediately preceding frames not received correctly in the last block, the recipient device may also update the Frame Bitmap each time it receives a frame with ACK Policy set to B-ACK but not B-ACK Request, without further updating this bitmap field for the next B-ACK frame upon receipt of the last frame of the block (i.e., the next frame with B-ACK Request set).

The recipient device may further update the Buffer Size and Frame Count at the time it updates the Sequence Control and Frame Bitmap by treating the last frame of the block that is not yet received as a frame occupying the receive buffer, making no further update to these two fields upon receiving the last frame of the block. With these advance updates, the B-ACK frame payload is prepared before the B-ACK request is received, and is ready to be sent without further changes in response to the frame with B-ACK Request set. The recipient device updates all the fields of the B-ACK frame body that are affected by the receipt of the frame with B-ACK Request set before or upon receiving the first frame of the next block.

According to an embodiment, a recipient device may discontinue the B-ACK mechanism by rejecting a B-ACK request at any time for any reason, such as temporary unavailability of resources or a lengthy setup process requiring a delayed start time or the like. The recipient device rejects a B-ACK request by sending a B-ACK frame with no frame payload. Upon receiving the rejection from the recipient device, a source device may re-initiate the B-ACK mechanism until the recipient device accepts a new B-ACK request or the source device decides not to use the B-ACK mechanism for the stream or traffic of concern. The termination procedure is further described in what follows.

In an embodiment, upon completing the transmission of the current stream or traffic with the B-ACK mechanism, the source device, whenever possible, sends the last transmitted frame with ACK Policy set to anything other than B-ACK or B-ACK Request. The recipient device responds to this frame with a B-ACK frame with no frame payload, and releases the resources such as buffer space that has been allocated to support the B-ACK mechanism for the stream or traffic. When the recipient device does not receive any frame set up for an instance of the B-ACK mechanism for an implementation-dependent timeout period, it releases the resources reserved for supporting this B-ACK instance. The recipient device may also terminate the instance of the B-ACK mechanism by responding to a frame with ACK Policy set to B-ACK Request with a B-ACK control frame of no frame payload.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of frame exchange between a first device and a second device in a network, said method comprising:
   receiving a plurality of blocks of data frames transmitted in succession by the first device:
   after receiving a last block of data frames transmitted in succession by the first device, the second device returning to the first device a block acknowledgment frame, wherein the block acknowledgment frame including an information indicating a maximum number of data frames in a next block of data frames the first device is allowed to transmit in succession to the second device;
   before transmitting any block of data frames to the second device, transmitting a data frame from the first device to the second device, the data frame indicating an acknowledgment policy of a block acknowledgment request; and
   if the second device is not to receive a subsequent block of data frames in succession from the first device for any reason, then transmitting the block acknowledgement frame, the block acknowledgement frame having no frame payload.

2. A method of frame exchange between a first device and a second device in a network, said method comprising:
   receiving a plurality of blocks of data frames transmitted in succession by the first device:
   after receiving a last block of data frames transmitted in succession by the first device, the second device returning to the first device a block acknowledgment frame, wherein the block acknowledgment frame including an information indicating a maximum number of data frames in a next block of data frames the first device is allowed to transmit in succession to the second device;
   before transmitting any block of data frames to the second device, transmitting a data frame from the first device to the second device, the data frame indicating an acknowledgment policy of a block acknowledgment request; and
   after receiving the data frame indicating the block acknowledgment request transmitted by the first device, the second device returning to the first device the block acknowledgment frame with no payload, wherein the block acknowledgment frame with no payload is equivalent to the block acknowledgment frame indicating a maximum number of one data frame in a next block of data frames the first device is allowed to transmit in succession to the second device.

* * * * *